US009471381B2

United States Patent
Solihin

(10) Patent No.: US 9,471,381 B2
(45) Date of Patent: *Oct. 18, 2016

(54) RESOURCE ALLOCATION IN MULTI-CORE ARCHITECTURES

(71) Applicant: EMPIRE TECHNOLOGY DEVELOPMENT LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,716

(22) Filed: Mar. 13, 2015

(65) Prior Publication Data

US 2015/0186186 A1    Jul. 2, 2015

Related U.S. Application Data

(63) Continuation of application No. 13/812,400, filed as application No. PCT/US2012/051803 on Aug. 22, 2012, now Pat. No. 8,990,828.

(51) Int. Cl.
  *G06F 9/46* (2006.01)
  *G06F 9/50* (2006.01)

(52) U.S. Cl.
  CPC ............. *G06F 9/5016* (2013.01); *G06F 9/50* (2013.01); *G06F 9/5005* (2013.01); *G06F 2209/503* (2013.01); *G06F 2209/5018* (2013.01)

(58) Field of Classification Search
  None
  See application file for complete search history.

(56) References Cited

U.S. PATENT DOCUMENTS

| 5,504,670 | A | | 4/1996 | Barth et al. |
| 6,058,423 | A | * | 5/2000 | Factor ................. G06F 9/465 709/223 |
| 6,473,845 | B1 | | 10/2002 | Hornung et al. |
| 6,735,613 | B1 | * | 5/2004 | Jean-Dominique ... G06F 9/5016 711/170 |
| 7,007,108 | B2 | | 2/2006 | Emerson et al. |
| 7,415,709 | B2 | * | 8/2008 | Hipp ................. G06F 9/4843 718/1 |
| 7,467,381 | B2 | * | 12/2008 | Madukkarumukumana ............. G06F 9/5077 710/200 |

(Continued)

OTHER PUBLICATIONS

Nesbit et al. "Multicore Resource Management", 2008 IEEE, pp. 6-16.*

(Continued)

*Primary Examiner* — Van Nguyen
(74) *Attorney, Agent, or Firm* — Moritt Hock & Hamroff LLP; Steven S. Rubin, Esq.

(57) ABSTRACT

Technologies are generally described for a method, device and architecture effective to allocate resources. In an example, the method may include associating first and second resources with first and second resource identifiers and mapping the first and second resource identifiers to first and second sets of addresses in a memory, respectively. The method may include identifying that the first resource is at least partially unavailable. The method may include mapping the second resource identifier to at least one address of the first set of addresses in the memory when the first resource is identified as at least partially unavailable. The method may include receiving a request for the first resource, wherein the request identifies a particular address of the addresses in the first set of addresses. The method may include analyzing the particular address to identify a particular resource and allocating the request to the particular resource.

20 Claims, 7 Drawing Sheets

(56) References Cited

U.S. PATENT DOCUMENTS

| | | | |
|---|---|---|---|
| 7,552,436 B2* | 6/2009 | Brice, Jr. | G06F 9/45537 710/3 |
| 7,594,229 B2 | 9/2009 | Hirschsohn | |
| 7,703,102 B1 | 4/2010 | Eppstein et al. | |
| 7,853,755 B1 | 12/2010 | Agarwal et al. | |
| 8,024,740 B2 | 9/2011 | Kawato | |
| 8,051,171 B2 | 11/2011 | Batni et al. | |
| 8,195,888 B2 | 6/2012 | Solihin | |
| 8,234,650 B1 | 7/2012 | Eppstein et al. | |
| 8,286,174 B1 | 10/2012 | Schmidt et al. | |
| 8,671,411 B2 | 3/2014 | Gosalia et al. | |
| 8,745,628 B2 | 6/2014 | Buco et al. | |
| 8,776,061 B2 | 7/2014 | Levin et al. | |
| 8,990,828 B2* | 3/2015 | Solihin | 718/104 |
| 2006/0150138 A1 | 7/2006 | Rhee | |
| 2007/0168620 A1 | 7/2007 | Leonard et al. | |
| 2009/0172690 A1 | 7/2009 | Zimmer et al. | |
| 2009/0182605 A1 | 7/2009 | Lappas et al. | |
| 2010/0325429 A1 | 12/2010 | Saha et al. | |
| 2011/0004791 A1 | 1/2011 | Kokubu et al. | |
| 2012/0096462 A1 | 4/2012 | Kim | |
| 2012/0198465 A1 | 8/2012 | Hande et al. | |
| 2013/0205141 A1 | 8/2013 | Solihin | |

OTHER PUBLICATIONS

Yoon et al. "Optimizing TunableWCET with Shared Resource Allocation and Arbitration in Hard Real-Time Multicore Systems", 2011 IEEE, pp. 227-238.*

Ge et al. "Task Allocation for Minimum System Power in a Homogenous Multi-core Processor", 2010 IEEE, 8 pages.*

Kharbutli, M., et al., "Using Prime Numbers for Cache Indexing to Eliminate Conflict Misses," Proc. of the 10th Intl. Symposium on High Performance Computer Architecture (HPCA), pp. 288-299 (2004).

Marty, M.R., and Hill, M.D., "Virtual hierarchies to support server consolidation," Proceedings of the 34th annual international symposium on Computer architecture (ISCA), pp. 46-56 (2007).

International Search Report with written opinion for International Application No. PCT/US2012/051803 mailed on Dec. 7, 2012, 14 pages.

* cited by examiner

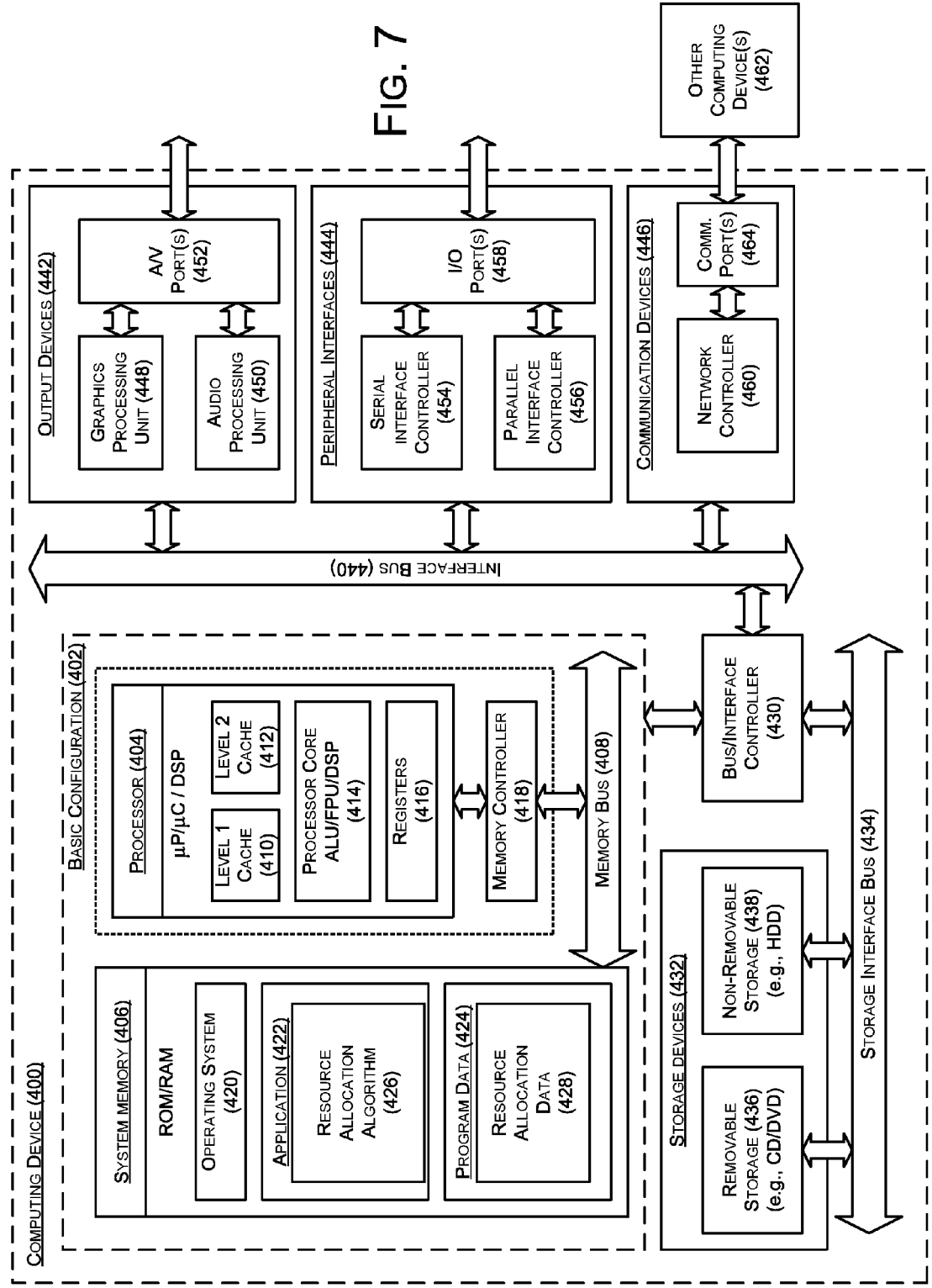

RESOURCE ALLOCATION IN MULTI-CORE ARCHITECTURES

CROSS-REFERENCE TO RELATED APPLICATIONS

This Application is a continuation under 35 U.S.C. §120 of U.S. application Ser. No. 13/812,400 filed on Feb. 11, 2013, now U.S. Pat. No. 8,990,828, which in turn is a U.S. national stage filing under 35 U.S.C. §371 of International Application Ser. No. PCT/US12/51803 filed on Aug. 22, 2012. The disclosure of U.S. application Ser. No. 13/812, 400 and PCT/US12/51803 is incorporated herein by reference in its entirety.

BACKGROUND

Unless otherwise indicated herein, the materials described in this section are not prior art to the claims in this application and are not admitted to be prior art by inclusion in this section.

In multi-core architectures, multiple processor cores may be included in a single integrated circuit die or on multiple integrated circuit dies that are arranged in a single chip package. A cache may be used to store data for access by one or more of the processor cores. Resources in the die may be distributed across two or more tiles. Such resources may include, for example, a directory configured to maintain coherence for the caches, memory controllers, processor cores, caches, etc.

SUMMARY

In some examples, a method for a controller to allocate resources in a multi-core architecture is generally described. The method may include associating first and second resources with first and second resource identifiers. The method may further include mapping the first and second resource identifiers to first and second sets of addresses in a memory. The first set of addresses may be different from the second set of addresses. The method may further include identifying that the first resource is at least partially unavailable. The method may include mapping the second resource identifier to at least one address of the first set of addresses in the memory when the first resource is identified as at least partially unavailable. The method may further include receiving a request for the first resource. The request may identify a particular address of the addresses in the first set of addresses. The method may further include analyzing the particular address to identify a particular resource. The method may further include allocating the request to the particular resource.

In some examples, a device effective to allocate resources in a multi-core architecture is generally described. The device may include a controller and a memory in communication with the controller. The controller may be configured to associate first and second resources with first and second resource identifiers, respectively. The controller may be configured to map the first and second resource identifiers to first and second sets of addresses in a memory. The first set of addresses may be different from the second set of addresses. The controller may be configured to determine that the first resource is at least partially unavailable. The controller may be configured to map the second resource identifier to at least one address of the first set of addresses in the memory when the first resource is determined to be at least partially unavailable. The controller may be configured to receive a request for the first resource. The request may identify a particular address in the first set of addresses. The controller may be configured to analyze the particular address in the memory to identify a particular resource. The controller may be configured to allocate the request to the particular resource.

In some examples, a multi-core architecture effective to allocate resources is generally described. The architecture may include a first resource, a second resource, a controller configured in communication with the first and the second resource and a memory configured in communication with the controller. The controller may be configured to associate first and second resources with first and second resource identifiers. The controller may be configured to map the first and second resource identifiers to first and second sets of addresses in the memory. The first set of addresses may be different from the second set of addresses. The controller may be configured to determine that the first resource is at least partially unavailable. The controller may be configured to map the second resource identifier to at least one address of the first set of addresses in the memory when the first resource is determined to be at least partially unavailable. The controller may be configured to receive a request for the first resource. The request may identify a particular address in the first set of addresses. The controller may be configured to analyze the particular address in the memory to identify a particular resource. The controller may be configured to allocate the request to the particular resource.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement resource allocation in a multi-core architecture.

DETAILED DESCRIPTION

Figure 1:
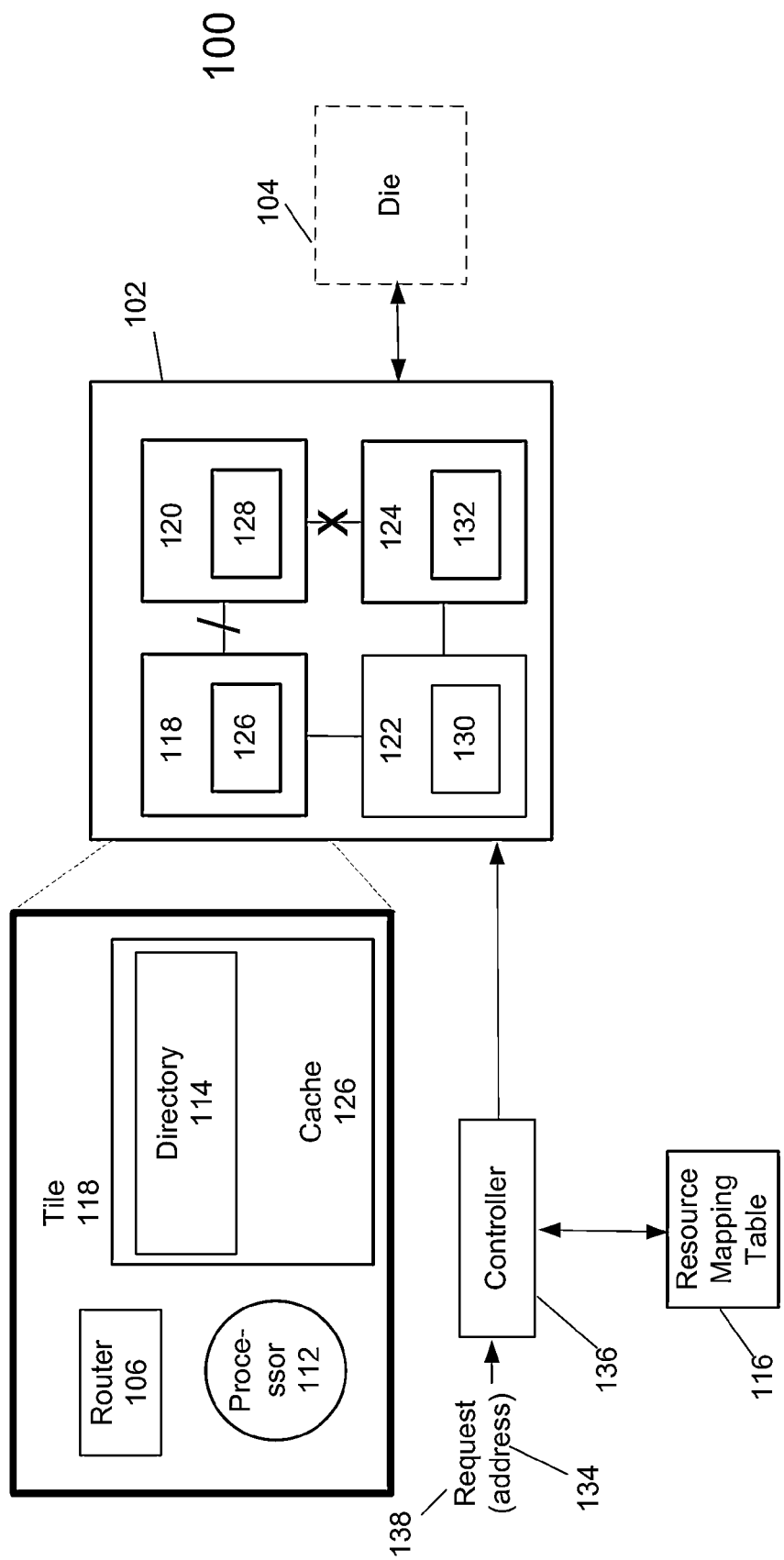
FIG. 1 illustrates an example system that can be utilized to implement resource allocation in a multi-core architecture.

In the present detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatus, systems, devices, and computer program products related to resource allocation in multi-core architectures.

Briefly stated, technologies are generally described for a method, device and architecture effective to allocate resources. In an example, the method may include associating first and second resources with first and second resource identifiers and mapping the first and resource identifiers to first and second sets of addresses in a memory. The method may include identifying that the first resource is at least partially unavailable. The method may include mapping the second resource identifier to at least one address of the first set of addresses in the memory when the first resource is identified as at least partially unavailable. The method may include receiving a request for the first resource, wherein the request identifies a particular address of the addresses in the first set of addresses. The method may include analyzing the particular address to identify a particular resource and allocating the request to the particular resource.

FIG. 1 illustrates an example system that can be utilized to implement resource allocation in multi-core architectures arranged in accordance with at least some embodiments described herein. An example system 100 may include a die 102 including a plurality of tiles 118, 120, 122 and/or 124. Focusing on tile 118 for illustration, tile 118 may include a cache 126, a processor or processor core (hereinafter referred to as "processor") 112, a router 106, and/or a directory 114. Processor 112 may be adapted to process data including code (hereinafter both data and/or code referred to as "data block"). Cache 126 may be configured to store a data block local to processor 112. System 100 may further include a controller 136 adapted to communicate with a resource mapping table 116 and die 102.

As is described in more detail below, when a request 138 is received by a controller 136, the controller 136 may allocate a resource in die 102 to process request 138. Controller 136 may make the allocation based on an address 134 in request 138 and based on resource mapping table 116. Allocations by controller 136 may be effective to adapt to events where resources in die 102 become partially or completely unavailable, such as by an interconnect link failure or broken router, or another limitation associated with bandwidth that is too low or latency that is too high. For example, as shown in FIG. 1 with the symbol "X", communication between tile 124 and 120 may be completely unavailable. Communication between tile 118 and 120 may be partially unavailable as indicated by the symbol "/". As tile 120 is at least partially unavailable, controller 136 may allocate resources to request 138 by avoiding or limiting allocation of resources to tile 120. An unavailable or partially unavailable tile or resource may be detected by controller 136, such as upon a start up of die 102, and may be in response to delivery time outs of test messages from controller 136 to tiles in die 102.

Die 102 may include a matrix (e.g., array) of tiles 118, 120, 122, 124 including respective caches 126, 128, 130, 132. Focusing on tile 118 for illustration, tile 118 may also include one or more of a respective processor 112, directory 114, and/or router 106. Each tile in die 102 may be substantially the same as in a homogenous arrangement or some tiles may be different as in a heterogeneous arrangement. Die 102 may be arranged in communication with another die 104 so that data may be shared among a plurality of dies.

Directory 114 may be a directory that identifies (e.g., indexes) a location associated with data blocks that are stored in the tiles of die 102. Directory 114 may be located in a single tile on die 102 or distributed among many or all tiles. If directory 114 is distributed, for example, a first range of addresses (such as 0x0000-0x1000) may be stored in a first tile, a second range of addresses (such as 0x1001-0x2000) stored in a second tile, etc. Directory 114 in FIG. 1 thus may illustrate a first portion of an entire die directory where that first portion may be stored in tile 118 and additional portions may be stored in other tiles such as tiles 120, 122, 124, etc.

Figure 2:
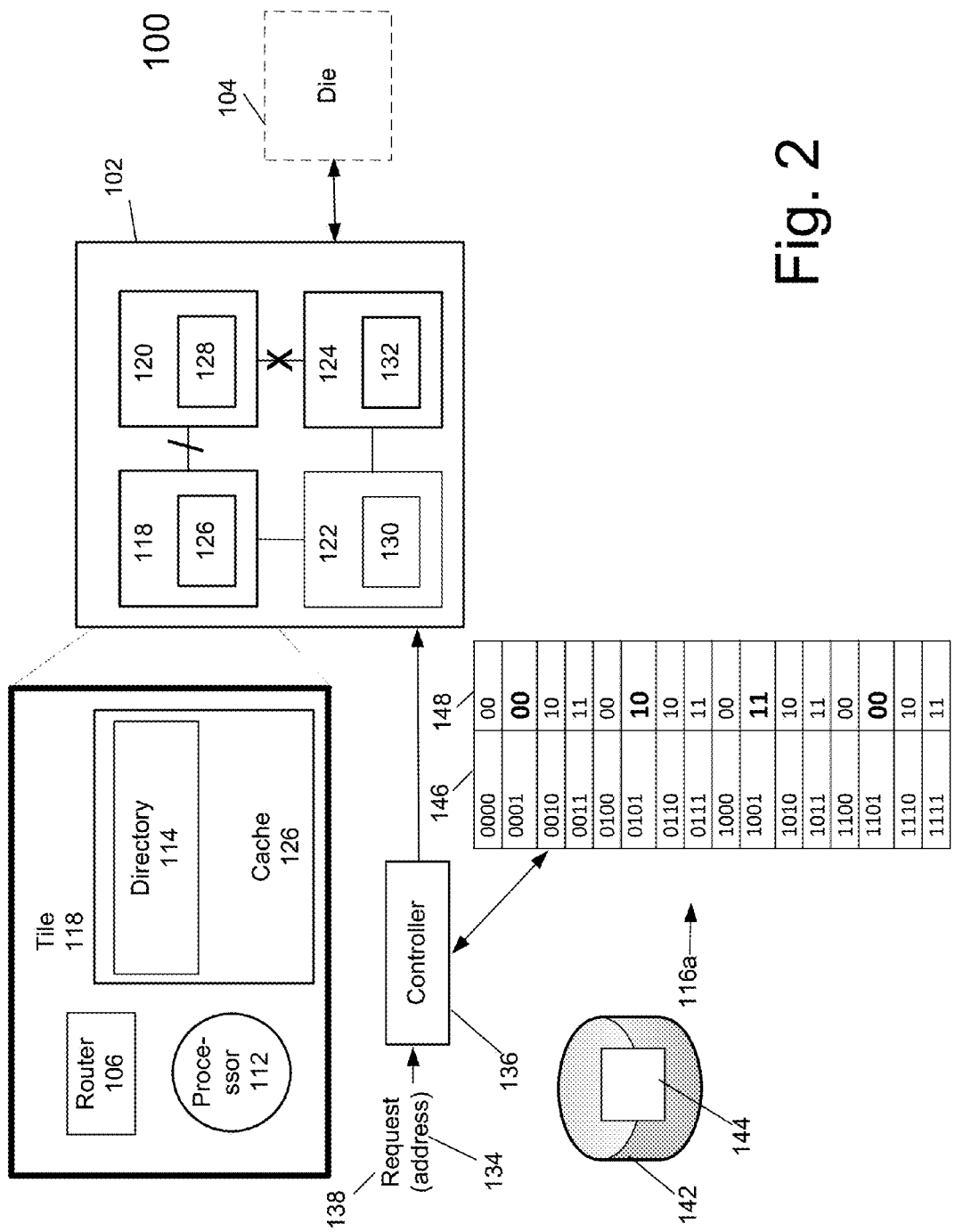
FIG. 2 illustrates an example system that can be utilized to implement resource allocation in a multi-core architecture.

FIG. 2 illustrates an example system that can be utilized to implement resource allocation in multi-core architectures arranged in accordance with at least some embodiments described herein. Those components in FIG. 2 that are labeled identically to components of FIG. 1 will not be described again for the purposes of clarity.

An example resource mapping table 116a is shown in FIG. 2, and may be conceptually thought of as an expanded resource mapping table. Resource mapping table 116a may include an index 146 and a resource field 148. Controller 136 may associate resource identifiers in resource field 148 with respective resources in die 102. In the example, a resource identifier 00 may correspond to tile 118, a resource identifier 01 may correspond to tile 120, a resource identifier 10 may correspond to tile 122 and a resource identifier 11 may correspond to tile 124. Examples of resources that utilize addresses for usage allocation include distributed caches, coherence protocol directories, memory controllers, memory channels, memory banks, etc.

Controller 136 may further map resource identifiers in resource field 148 to sets of addresses in index 146. Controller 136 may virtually map addresses in index 146 to physical resources in die 102 using resource mapping table 116a. In an example, resource mapping table 116a may include a number of entries corresponding to the number of resources R in die 102 raised to a power Y, where Y (the degree of the table) is an integer equal to or greater than 2. In the example shown, 4 resources 118, 120, 122 and 124 are illustrated and Y is 2 so that resource mapping table 116a has $4^2=16$ entries. A number of bits in address 134 used to identify available resources may be multiplied by Y so that, in the example, 2 bits, that could address the four resources, times Y, $\{2 \times Y(2)\}$=a 4 bit address that may be used in address 134 to identify one of the 4 available resources.

In the example, tile 120 has become at least partially unavailable and so controller 136 may be configured, such as by instructions 144 in memory 142, to modify resource mapping table 116a to change mapping of resource 120 corresponding to resource identifier "01". In the example, controller 136 may be configured to modify entries in resource field 148 of resource mapping table 116a to at least partially remove reference to tile 120 (resource identifier "01"). As shown in the example, for an address of "0001", instead of mapping resource identifier "01", controller 136 may map resource identifier "00" as shown in bold. For an address of "0101", controller 136 may map resource identifier "10" as shown in bold. For an address of "1101", controller 136 may map resource identifier "00". In this way, when address 134 includes a request for resource identifier "01", as identified by an address ending with "01" (0001, 0101, 1001, 1101), resource mapping table 116a may allocate these requests among other resources thereby balancing the request among resources in die 102. In the example, resource identifier "00" may be associated with 37.5% of addresses, resource identifier "10" may be associated with 31.25% of addresses and resource identifier "11" may be associated with 31.25% of addresses. Each entry may receive ¼ of addresses that are originally mapped to the entry, plus a portion of the ¼ addresses that were assigned to the unavailable resources. Since the portion is split in the following ratio 1:1:2 among three remaining resources, then one resource gets ¼+¼*²⁄₄=0.375, while two other resources each gets ¼+¼*¹⁄₄=0.3125. Controller 136 may customize resource allocation by adjusting assignments in resource mapping table 116a to send some requests to tile 120 as there may be some communication between tile 118 and 120 as shown by the symbol "/".

A permutation device 170 may be in communication with controller 136 and table 116a. Permutation device 170 may be used to permute address 134 to balance processing of bits in address 134 by controller 136. Permutation device 170 may permute or rotate an order of bits in address 134 to further balance resources by applying different bits of address 134 to tables 150, 152, 154. Permutation device 170 may include an exclusive OR (XOR) or other type of permutation or randomizing circuit. For example, various groups of six bits may be bitwise XOR-ed to produce a randomized six bit output.

Figure 3:
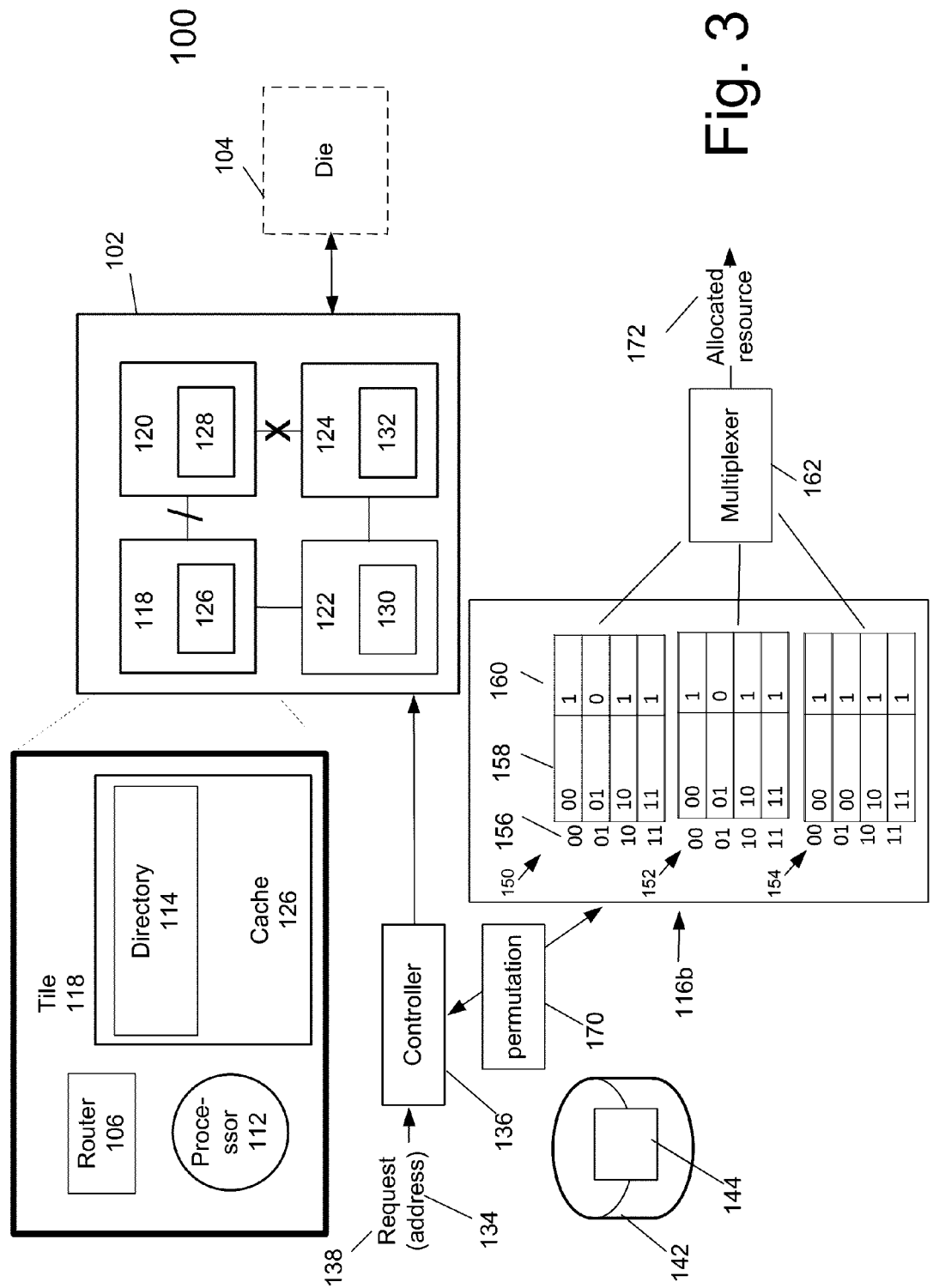
FIG. 3 illustrates an example system that can be utilized to implement resource allocation in a multi-core architecture.

FIG. 3 illustrates an example system that can be utilized to implement resource allocation in multi-core architectures arranged in accordance with at least some embodiments described herein. Those components in FIG. 3 that are labeled identically to components of FIG. 1 or 2 will not be described again for the purposes of clarity.

An example resource mapping table 116b is shown in FIG. 3, which may be conceptually thought of as a cascaded resource mapping table. Resource mapping table 116b may include tables 150, 152 and/or 154. Each table 150, 152, and 154, may have as many entries as the number of resources. The number of tables may be referred to as the degree. Any of the tables 150, 152, 154 may include an index 156, a resource identifier field 158 and/or a validity identifier field 160. Bits in address 134 may be indexed to tables 150, 152, 154. In the example, a first (less significant) two bits in address 134 may index first table 150. A second two bits in address 134 may index second table 152 and a third (more significant) two bits in address 134 may index third table 154. Outputs of tables 150, 152, 154 including data from resource identifier field 158 and validity identifier field 160 may be fed to a multiplexer 162 and an output of multiplexer 162 may identify an allocated resource 172. Resource identifiers may be mapped to sets of addresses in index 156. For example, resource identifier "00", corresponding to resource 118, may be mapped to the set of addresses {XXXX00, XX0001, 000101, and 010101}. Resource identifier "10", corresponding to resource 122, may be mapped to the set of addresses {XXXX10, XX1001, 100101}. Resource identifier "11", corresponding to resource 124, may be mapped to the set of addresses {XXXX11, XX1101, 110101}. Resource identifier "01", corresponding to unavailable resource 120, may be mapped to a NULL set of addresses.

As is explained in more detail below, controller 136 may modify bits in validity identifier field 160 to avoid allocation of a resource by multiplexer 162 and/or balance a load of requests to resources. In the example, tile 120 corresponding to resource identifier "01" in table 150 is mapped to an invalid status as indicated by the validity identification "0". Tile 120 corresponding to resource identifier "01" in table 152 is mapped to an invalid status as indicated by the validity identifier "0". Multiplexer 162 may be configured to not select an output from table 150 or table 152 because output from table 150 and 152 have an invalid status. In the example, in table 154, controller 136 has re-mapped address input "01" to resource identifier "00" and to a valid status as indicated by validity identifier "1". In the example, as resource 120 corresponding to resource identifier "01" is at least partially unavailable, controller 136 has mapped resource identifier "01" to an invalid status in tables 150 and 152. In table 154, controller 136 has re-mapped address "01" to resource identifier "00" and with a valid status with validity identifier "1" to allow some requests to be sent to resource 118. If the entries in more than one table 150, 152, and 154 are valid, multiplexer 162 may be configured to give preference to assign the resource identifier from table 150 over table 152, or from table 152 over table 154.

In the example, address 134 may include "01 01 01". Multiplexer 162 may receive input from table 150 indicating an invalid status with validity identifier "0" because address "01" is mapped to resource identifier "01" and to validity identifier "0". Multiplexer 162 may receive input from table 152 indicating an invalid status with validity identifier "0" because address "01" is mapped to resource identifier "01" and to validity identifier "0". Multiplexer 162 may receive input from table 154 indicating a valid status with validity identifier "1" and corresponding to resource identifier 00 and so multiplexer may select resource identifier "00" for allocated resource 172. In another example, address 134 may include "01 01 00". Multiplexer 162 may receive input from table 150 indicating a valid status with validity identifier "1" because the least significant bits "00" is mapped to resource identifier "00" and validity identifier "1". Multiplexer 162 may select resource identifier "00" for allocated resource 172. In another example, address 134 may include "01 00 01". Multiplexer 162 may receive input from table 150 indicating an invalid status with validity identifier "0" because the least significant bits of the address "01" is mapped to resource identifier "01" and to validity identifier "0". Multiplexer 162 may receive input from table 152 indicating a valid status with validity identifier "1" because address "00" is mapped to resource identifier "00" and to validity identifier "1". Multiplexer 162 may select resource identifier "00" for allocated resource 172.

Tables 150, 152 and 154 may allow controller 136 to distribute requests directed to unavailable resources among available resources. Controller 136 may also balance a load of requests among available resources. In the example, resource distribution may be 34.4% to resource identifier 00, 32.8% to resource identifier 10 and 32.8% to resource identifier 11. For example, one resource gets ¼, plus ¼*¼, plus ¼*¼*²⁄₄=0.34375, while the other two resources get ¼, plus ¼*¼, plus ¼*¼*¹⁄₄=0.328125.

A permutation device 170 may be in communication with controller 136 and table 116b. Permutation device 170 may be used to permute address 134 to balance processing of bits in address 134 by controller 136. For example, if multiplexer is designed to cycle through tables 150, 152, 154, in that order, without permuting, resource identifier 158 in table 150 may be used more often than resource identifiers in other tables. As a consequence, the bits in address 134 fed to table 150 may be used more frequently than other bits in address 134. Permutation device 170 may permute or rotate an order of bits in address 134 to further balance resources by applying different bits of address 134 to tables 150, 152, 154. Permutation device 170 may include an exclusive OR (XOR) or other type of permutation or randomizing circuit. For example, various groups of six bits may be bitwise XOR-ed to produce randomized six bit output.

Figure 4:
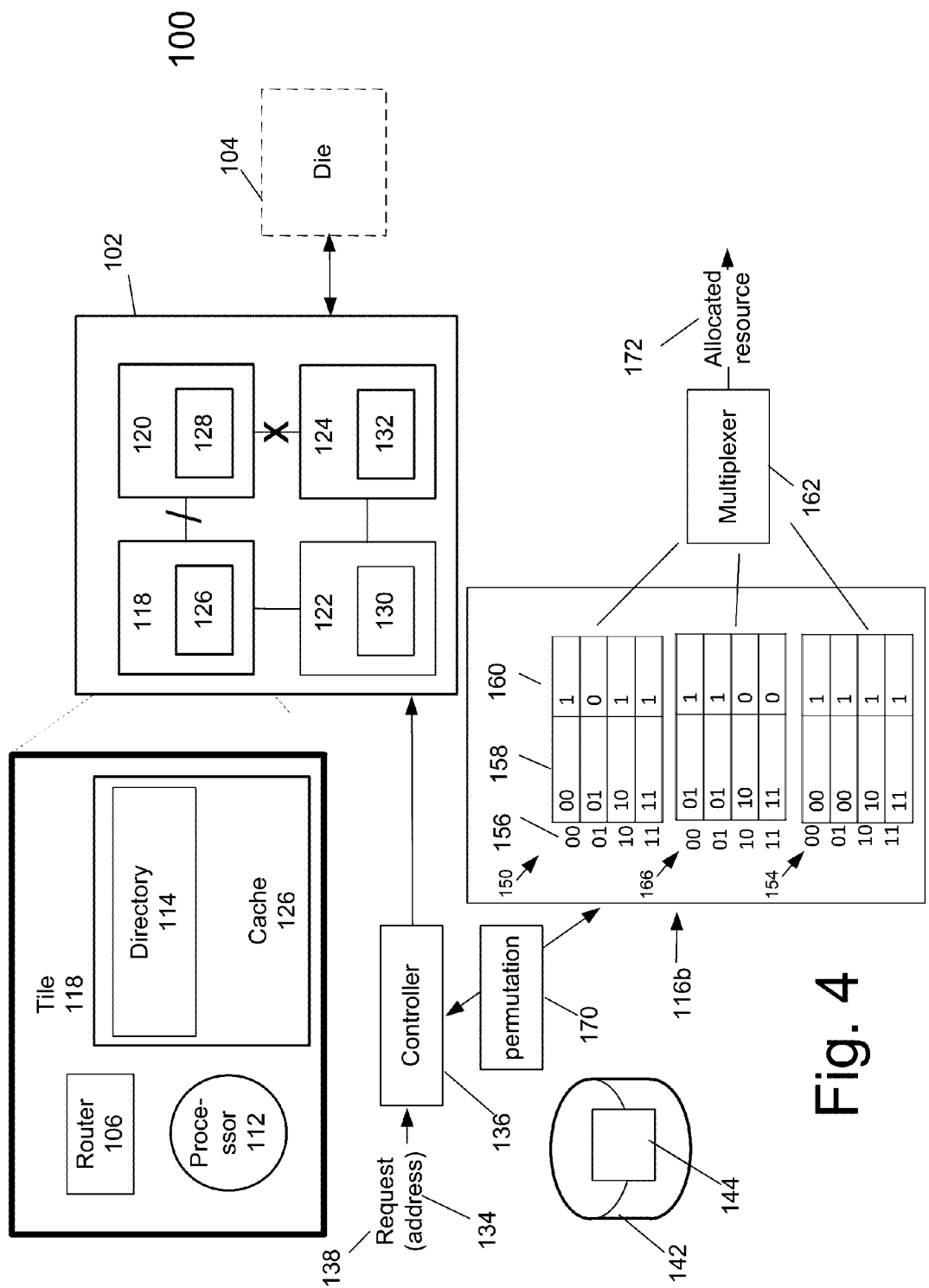
FIG. 4 illustrates an example system that can be utilized to implement resource allocation in a multi-core architecture.

FIG. 4 illustrates an example system that can be utilized to implement resource allocation in multi-core architectures arranged in accordance with at least some embodiments described herein. Those components in FIG. 4 that are labeled identically to components of FIG. 1, 2 or 3 will not be described again for the purposes of clarity.

In examples when resource 120, corresponding to resource identifier 01, is partially isolated, controller 136 may map data in resource identifier field 158 and validity identifier field 160 to adjust resource allocation so that resource 120 receives some but reduced requests. In the example shown in FIG. 4, table 166 is modified compared to table 154 in FIG. 3. Table 166 has two valid status entries for resource identifier 01 corresponding to resource 120 and so resource 120 may receive 12.5% of all addresses. Resource identifier 00 may receive 31.3% of addresses, resource identifier 10 may receive 28.1% of addresses and resource identifier 11 may receive 28.1% of addresses. For example: Resource 00: ¼ in table 1+0 in table 2+¼*⅔*⅔ in table 3=31.25%. Resource 01: 0 in table 1+¼*⅔ in table 2+0 in table 3=12.5%. Resource 10: ¼ in table 1+0 in table 2+¼*⅔*¼ in table 3=28.125%. The larger the number of entries or tables, the more finely tuned resource distributed can be made.

Among other possible benefits, a system in accordance with the disclosure may be able to adapt to map out or partially map out allocation of resources that are completely or partially unavailable so that operations may continue. Balanced resource use may be realized even with mapped out resources. Resource balancing may be customized to adjust load capacity of partially isolated resources. The load capacity adjustment can be made more finely tuned with larger number of entries in the expanded resource mapping table or with a larger number of tables in the cascaded resource mapping table. The ability to fine tune resource distribution may be balanced against the overhead that comes from larger number of entries or tables.

Below is a table illustrating storage overheads that may be used in examples using some of the approaches described herein:

| Number of Resources | Degree | Table 116a expanded | Table 116b cascaded | Cascaded 116b as a % of expanded 116a |
|---|---|---|---|---|
| 4 | 2 | 4 bytes | 2 bytes | 50% |
|  | 3 | 16 bytes | 3 bytes | 18.8% |
|  | 4 | 64 bytes | 4 bytes | 6.3% |
| 16 | 2 | 128 bytes | 16 bytes | 12.5% |
|  | 3 | 2 KB | 24 bytes | 1.2% |
|  | 4 | 32 KB | 32 bytes | 0.1% |
| 64 | 2 | 3 KB | 96 bytes | 3.1% |
|  | 3 | 197 KB | 144 bytes | 0.1% |
|  | 4 | 12.6 MB | 192 bytes | 0.0% |
| 256 | 2 | 64 KB | 512 bytes | 0.8% |
|  | 3 | 16.7 MB | 768 bytes | 0.0% |
|  | 4 | 4.3 GB | 1 KB | 00% |

Figure 5:
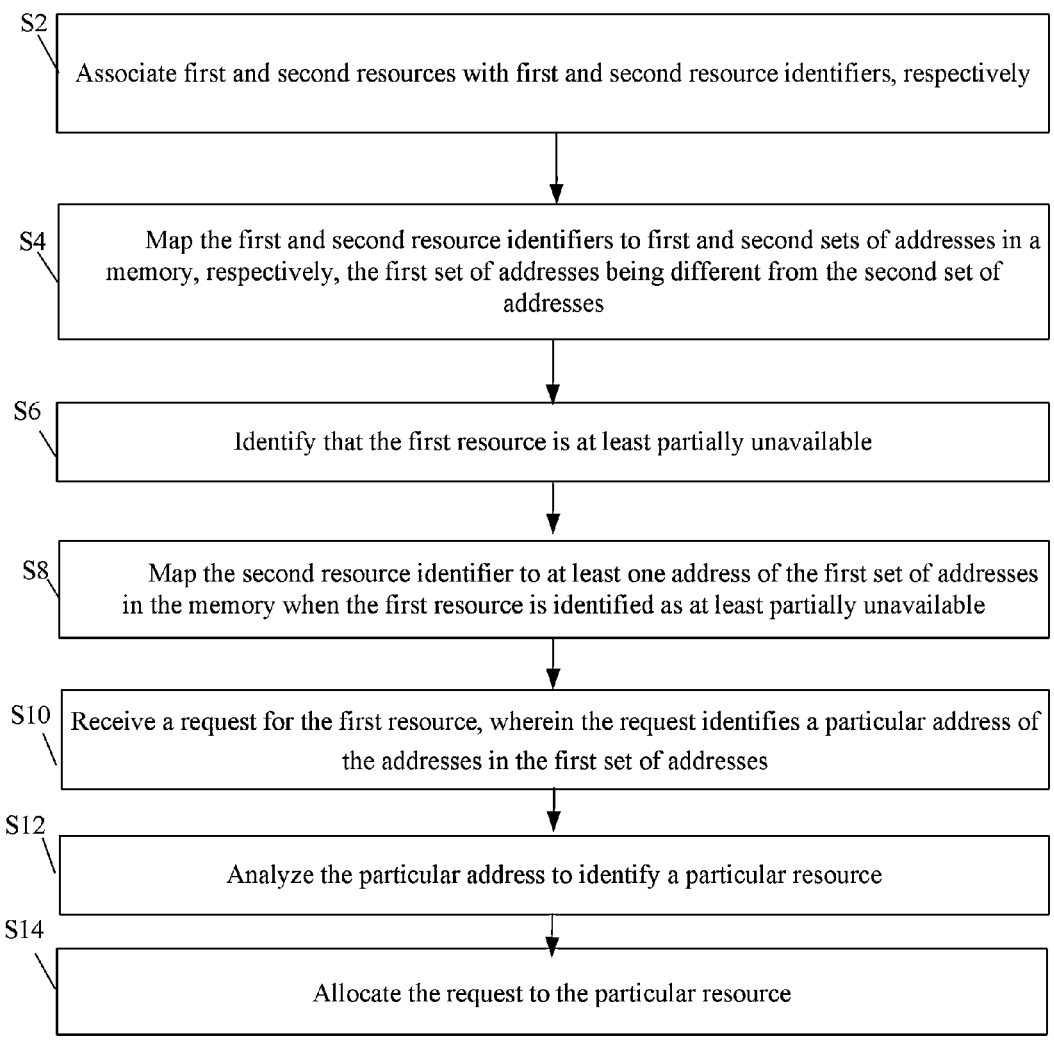
FIG. 5 depicts a flow diagram for an example process for implementing resource allocation in a multi-core architecture.

FIG. 5 depicts a flow diagram for an example process for implementing resource allocation in multi-core architectures arranged in accordance with at least some embodiments described herein. In some examples, the process in FIG. 5 could be implemented using system 100 discussed above. An example process may include one or more operations, actions, or functions as illustrated by one or more of blocks S2, S4, S6, S8, S10, S12, S14 and/or S16. Although illustrated as discrete blocks, various blocks may be divided into additional blocks, combined into fewer blocks, or eliminated, depending on the desired implementation.

Processing may begin at block S2, "Associate first and second resources with first and second resource identifiers, respectively." At block S2, a controller may be configured to assign first and second resources with first and second resource identifiers. For example, resources may include tiles in a multi-core architecture.

Processing may continue from block S2 to block S4, "Map the first and second resource identifiers to first and second sets of addresses in a memory, respectively, the first set of addresses being different from the second set of addresses." At block S4, the controller may map the resource identifiers to respective sets of addresses. By this mapping, requests to an address may be allocated to resources.

Processing may also continue from block S4 to block S6, "Identify that the first resource is at least partially unavailable." At block S6, the controller may determine that one of the resources may be at least partially unavailable. For example, one or more network links to the resource may be broken or partially broken limiting bandwidth.

Processing may continue from block S6 to block S8, "Map the second resource identifier to at least one address of the first set of addresses in the memory when the first resource is identified as at least partially unavailable." At block S8, the controller may map the second resource identifier to at least one of the addresses in the first set of addresses. By this mapping, the second resource may be allocated by the controller when a request is received identifying an address previously corresponding to the first resource. In some examples, the controller may map a third resource identifier, corresponding to a third resource, to the first set of address. By mapping the third resource identifier, the controller may be able to balance a load of requests for the first resource among the second and third resources. The controller may further map validity identifiers to the first, second, and third resource identifiers to facilitate further load balancing of resources.

Processing may continue from block S8 to block S10, "Receive a request for the first resource, wherein the request identifies a particular address of the addresses in the first set of addresses." At block S10, the controller may receive a request for the first resource at one of addresses in the first set of addresses. In some examples, the controller may permute the address.

Processing may continue from block S10 to block S12, "Analyze the particular address to identify a particular resource." At block S12, the controller may analyze the particular address and identify a particular resource. In examples where the particular address corresponds to the first resource, the controller may allocate the first resource to the request. In examples where the particular address corresponds to the second resource, the controller may allocate the second resource to the request.

Processing may continue from block S12 to block S14, "Allocate the request to the particular resource." At block S14, the controller may allocate the request to the particular resource.

Figure 6:
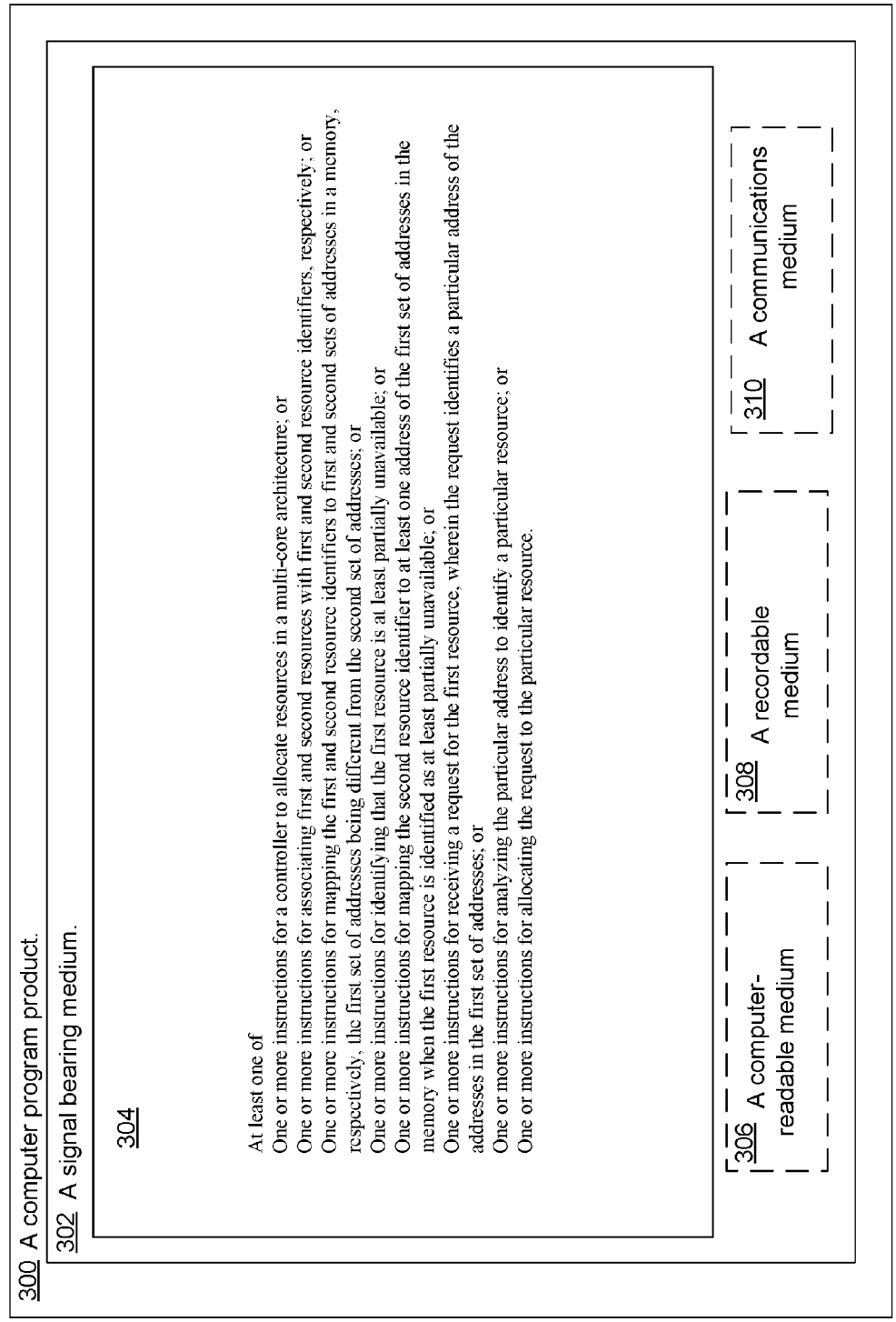
FIG. 6 illustrates a computer program product that can be utilized to implement resource allocation in a multi-core architecture.

FIG. 6 illustrates an example computer program product 300 that can be utilized to implement resource allocation in multi-core architectures arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, one or more of processors 112 in tiles 118, 120, 122, 124 may undertake one or more of the blocks shown in FIG. 6 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 7 is a block diagram illustrating an example computing device 400 that is arranged to implement resource allocation in multi-core architectures arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a resource allocation algorithm 426 that is arranged to perform the functions as described herein including those described with respect to system 100 of FIGS. 1-4. Program data 424 may include resource allocation data 428 that may be useful to implement resource allocation in multi-core architectures as is described herein. In some embodiments, application 422 may be arranged to operate with program data 424 on operating system 420 such that resource allocation in multi-core architectures may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to allocate resources in a multi-core architecture, the method comprising:

determining, by a controller, that a first resource is at least partially unavailable, wherein the first resource is associated with a first resource identifier;
based on the determination that the first resource is at least partially unavailable, mapping, by the controller, a second resource identifier to a first address in a set of addresses in a memory, wherein the second resource identifier is associated with a second resource;
mapping, by the controller, the second resource identifier to a second address in the memory;
receiving, by the controller, a request for the first resource, wherein the request identifies a particular address in the set of addresses;
analyzing, by the controller, the particular address identified by the request for the first resource;
identifying, by the controller, a particular resource based on the analysis of the particular address; and
allocating, by the controller, the request to the particular resource.

2. The method of claim 1, wherein:
the set of addresses includes a first set of addresses;
mapping the second resource identifier to the first address in the first set of addresses in the memory includes storing the second resource identifier in a first resource field of a resource map table, where the first resource field corresponds to a first index of the resource map table, and the first index corresponds to the first set of addresses in the memory; and
mapping the second resource identifier to the second address in the memory includes storing the second resource identifier in a second resource field of the resource map table, where the second resource field corresponds to a second index of the resource map table, and the second index corresponds to a second set of addresses in the memory.

3. The method of claim 1, wherein at least a portion of the particular address corresponds to an index of a resource map table, where the resource map table includes a resource field effective to store a particular resource identifier, and the particular resource identifier corresponds to the particular address.

4. The method of claim 1, wherein the particular resource includes one of the first resource and the second resource.

5. The method of claim 1, wherein the set of addresses corresponds to a sum of a number of resources in the multi-core architecture.

6. The method of claim 1, wherein identifying the particular resource is further based on the particular resource identifier and a validity identifier in a resource map table.

7. The method of claim 6, further comprising assigning a value to the validity identifier in response to the first resource being determined as at least partially unavailable.

8. The method of claim 1, wherein:
the first resource identifier is mapped to a first validity identifier prior to determining that the first resource is at least partially unavailable;
the second resource identifier is mapped to a second validity identifier prior to determining that the first resource is at least partially unavailable; and
identifying the particular resource includes analyzing the particular address to identify the particular resource based on the first validity identifier and the second validity identifier.

9. The method of claim 8, further comprising:
permuting the particular address in the request to produce a permuted address; and
analyzing the permuted address to identify the particular resource based on the first validity identifier and the second validity identifier.

10. A multi-core architecture effective to allocate resources, the multi-core architecture comprising:
a first resource associated with a first resource identifier;
a second resource associated with a second resource identifier; and
a controller configured to be in communication with the first and second resources,
wherein the controller is configured to:
determine that the first resource is at least partially unavailable;
based on the determination that the first resource is at least partially unavailable, map the second resource identifier to a first address in a set of addresses in a memory;
map the second resource identifier to a second address in the memory;
receive a request for the first resource, wherein the request identifies a particular address in the set of addresses;
analyze the particular address identified by the request for the first resource;
identify a particular resource based on the analysis of the particular address; and
allocate the request to the particular resource.

11. The multi-core architecture of claim 10, further comprising a resource map table, wherein the resource map table includes:
an index that corresponds to the particular address; and
a resource field effective to store a particular resource identifier that corresponds to the particular address.

12. The multi-core architecture of claim 11, wherein the resource map table further includes a validity identifier.

13. The multi-core architecture of claim 12, wherein the controller is configured to identify the particular resource based on the particular address, the particular resource identifier that corresponds to the particular address, and the validity identifier.

14. The multi-core architecture of claim 12, wherein the controller is further configured to assign a value to the validity identifier based upon the determination that the first resource is at least partially unavailable.

15. The multi-core architecture of claim 11, wherein the index corresponds to a portion that is less than an entirety of the particular address.

16. The multi-core architecture of claim 10, wherein:
the first resource identifier is mapped to a first validity identifier prior to the determination that the first resource is at least partially unavailable;
the second resource identifier is mapped to a second validity identifier prior to the determination that the first resource is at least partially unavailable; and
the controller is further configured to:
permute the particular address in the request to produce a permuted address; and
analyze the permuted address to identify the particular resource based on the first validity identifier and the second validity identifier.

17. A system effective to allocate resources in a multi-core architecture, the system comprising:
a memory configured to store a resource map table;
a controller configured to be in communication with the memory, the controller is configured to:

determine that a first resource is at least partially unavailable, wherein the first resource is associated with a first resource identifier;

based on the determination that the first resource is at least partially unavailable, store a second resource identifier in a first resource field of the resource map table, wherein the first resource field corresponds to a first index of the resource map table, and the first index corresponds to a first address in a set of addresses in the memory, and the second resource identifier is associated with a second resource;

store the second resource identifier in a second resource field of the resource map table, wherein the second resource field corresponds to a second index of the resource map table, and the second index corresponds to a second address in the memory;

receive a request for the first resource, wherein the request identifies a particular address in the set of addresses;

analyze the particular address to identify the particular resource; and allocate the request to the particular resource.

18. The system of claim 17, wherein the resource map table further includes a validity identifier field.

19. The system of claim 17, wherein the controller is configured to identify the particular resource based on the particular address, a particular resource identifier that corresponds to the particular address, and a validity identifier.

20. The system of claim 17, wherein:

the first resource identifier is mapped to a first validity identifier prior to the determination that the first resource is at least partially unavailable;

the second resource identifier is mapped to a second validity identifier prior to the determination that the first resource is at least partially unavailable; and the controller is further configured to:
permute the particular address in the request to produce a permuted address; and
analyze the permuted address to identify the particular resource based on the first validity identifier and the second validity identifier.

* * * * *